July 31, 1956  M. F. WHITLOW  2,756,954
FISHING ROD HOLDER
Filed July 9, 1952
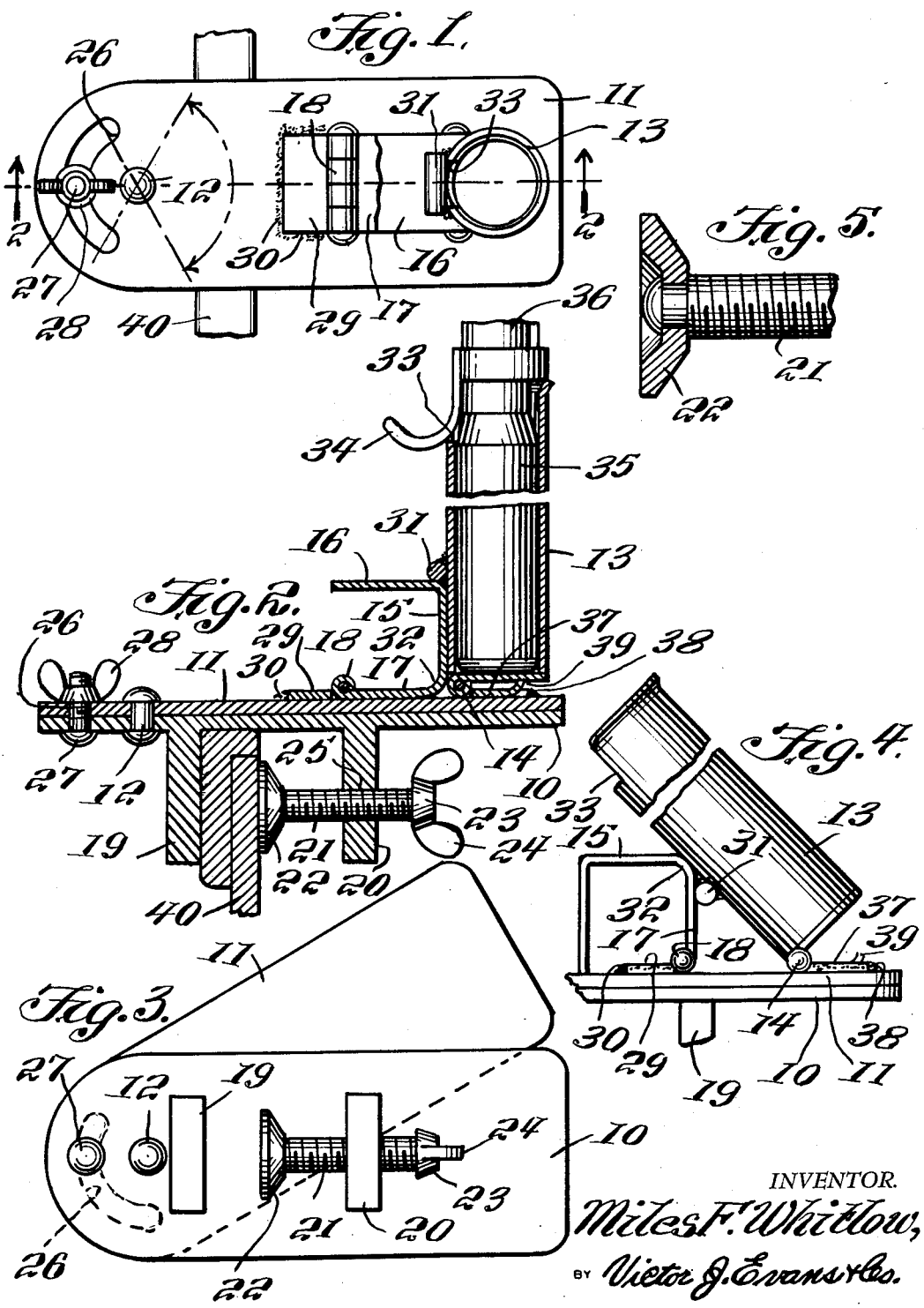
INVENTOR.
Miles F. Whitlow,
BY Victor J. Evans & Co.
ATTORNEYS

2,756,954

FISHING ROD HOLDER

Miles F. Whitlow, Chandler, Ariz.

Application July 9, 1952, Serial No. 297,929

5 Claims. (Cl. 248—42)

This invention relates to brackets for holding fishing rods to sides of boats or to rails on docks and other devices, and in particular a plate having a C-type of clamp on the under surface with an upper plate pivotally mounted on the former plate and with a fishing rod handle receiving socket in combination with a latch pivotally mounted on the upper plate.

The purpose of this invention is to provide a trip latch in combination with a fishing rod holder whereby a fishing rod supported therein may be extended upwardly for removing fish and replacing bait and may be diagonally positioned for fishing.

Various types of brackets have been provided for holding fishing rods particularly on sides of boats and other devices, however, it is difficult to provide a device that supports a fishing rod in a vertical position and also in a diagonal position in which the rod is held with a pivotally mounted latch member and without screws, bolts, or other temporary retaining elements. With this thought in mind this invention contemplates an upper plate having a tubular socket for receiving the handle of a fishing rod pivotally mounted on the upper surface with a latch member also pivotally mounted on the upper surface of the upper plate and adapted to be positioned, selectively whereby it clamps a fishing rod holding socket in a vertical position or supports the rod in an inclined position, and a mounting plate having a clamp on the under surface to which the upper plate is pivotally connected.

The object of this invention is, therefore, to provide means for forming a fishing rod supporting bracket whereby the bracket is readily adjusted from a vertical to an inclined position, and wherein the supporting means may be rotated in a horizontal plane to adjust the position of a fishing rod about a vertical axis.

Another object of the invention is to provide a fishing rod supporting bracket that may readily be clamped on the side of a boat or in a dock or the like.

A further object of the invention is to provide an improved fishing rod supporting bracket which is of a simple and economical construction.

With these and other objects and advantages in view the invention embodies a horizontally disposed mounting plate having clamp elements extended from the under surface, an upper plate pivotally mounted on the mounting plate, a tubular socket having a lug on one side pivotally mounted on the upper plate and a latch substantially U-shaped in cross section also pivotally mounted on the upper plate and positioned to be turned to one position for supporting the tubular socket in a vertical position and also to another position for providing a rest for supporting the socket in an inclined position.

Other features and advantages of the invention will appear from the following description taken in connection with the drawing, wherein;

Figure 1 is a plan view of the improved fishing rod holding bracket.

Figure 2 is a longitudinal section through the bracket taken on line 2—2 of Fig. 1.

Figure 3 is a view looking upwardly toward the under surface of the bracket showing the upper plate thereof extended at an angle from one side of the bracket.

Figure 4 is a side elevational view showing the intermediate part of the bracket with a fishing rod socket retaining latch turned from the position shown in Fig. 2 wherein the socket is retained in a vertical position, to a position wherein the socket is supported in an inclined position.

Figure 5 is a detail illustrating a washer on the end of the clamp screw.

Referring now to the drawing wherein like reference characters denote corresponding parts the improved fishing rod holding bracket of this invention includes a mounting plate 10, an upper plate 11 pivotally attached to the mounting plate with a pin 12, a tubular socket 13 hinged to the upper plate 11 with a hinge 14 and a latch 15 U-shape in cross section having a base with arms 16 and 17 and with the extended edge of the arm 17 hinged to the upper plate 11 with a hinge 18.

The mounting plate 10 is provided with spaced downwardly extended flanges 19 and 20 and a screw 21 having a washer 22 on one end and a head 23 with wings 24 extended therefrom on the other is threaded in an opening 25 in the flange 20, as shown in Fig. 2.

The upper plate 11 is provided with an arcuate slot 26, the radius of which is centered on the pin 12, and a stud 27 mounted in the plate 10 extends through the slot 26 whereby the plate 11 is adapted to swing about the pin 12 and the plate is clamped in position with a thumb nut 28 threaded on the stud 27.

A plate 29 of the hinge 18 is secured to the upper plate 11, preferably by welding as shown at the point 30 and the hinge is positioned whereby the latch 15 is selectively used for supporting the fishing rod holding socket 13 in a vertical position as shown in Fig. 2 or in an inclined position as shown in Fig. 4.

With the latch 15 in the position shown in Fig. 2 an upper corner thereof nests under a lug 31 on the side of the socket 13 and when it is desired to use the rod in an inclined position the latch is moved over to the position shown in Fig. 4 whereby the socket 13 rests upon an arcuate corner 32 of the latch.

The socket 13 is provided with a slot 33 that is positioned to receive a finger rest 34 of a handle 35 of a fishing rod as indicated by the numeral 36. With the finger rest 34 in the slot or notch 33 the fishing rod is retained in position with the rest preventing turning thereof in the socket.

A plate 37 of the hinge 14 is secured to the upper plate 11 preferably by welding, as shown at the point 38 and the plate 37 is provided with an upwardly extending finger 39 that is positioned to engage the lower end of the socket with the socket in a vertical position.

With the parts arranged in this manner the bracket is adapted to be clamped over a rail or side of a boat, as indicated by the numeral 40 with the clamp screw 21 clamping the side or rail against the flange 19 and with the bracket in position the socket 13 may extend vertically upward for holding a rod so that hooks, bait, and the like may be attached to the line and with the line in condition for fishing the latch 15 may be moved to the position shown in Fig. 4 whereby the rod and socket are adapted to be turned to an inclined position with the socket as shown in Fig. 4. The rod may extend straight outwardly from the bracket or as illustrated in Fig. 3, the upper plate with the rod holding socket may be turned about the pin 12 so that the line may follow a boat or the tide without changing the position of the bracket on the side of the boat or dock.

It will be understood that modifications, within the scope of the appended claims, may be made in the design and arrangement of the parts without departing from the spirit of the invention.

What is claimed is:

1. A fishing rod holder comprising a horizontally disposed mounting plate having a clamp on the under surface for engagement with a vertically disposed support, a horizontally disposed upper plate pivotally mounted, at one end, on the mounting plate in contact with and parallel to the mounting plate, a rod holding socket hinged to the upper plate, and a U-shaped latch having a base and a pair of parallel arms and with the outer end of one of the arms hinged to the upper plate and positioned to retain the socket in contactual relation with the base of the U-shaped latch, selectively, in a vertical position when said one arm is in contact with said upper plate in horizontal relation thereto and also adapted to support the socket in an inclined position when the ends of the arms are in contact with said upper plate and said arms are in vertical relation to said upper plate and said socket has been pivoted to have contactual relation with the end of said one arm where it is joined to said base.

2. A fishing rod holder comprising a horizontally disposed mounting plate having a clamp on the under surface for engagement with a vertically disposed support, a horizontally disposed upper plate pivotally mounted, at one end, on the mounting plate in contact with and parallel to the mounting plate, a rod holding socket hinged to the upper plate, a U-shaped latch having a base and a pair of parallel arms and with the outer end of one of the arms hinged to the upper plate and positioned to retain the socket in contactual relation with the base of the U-shaped latch, selectively, in a vertical position when said one arm is in contact with said upper plate in horizontal relation thereo and also adapted to support the socket in an inclined position when the ends of the arms are in contact with said upper plate and said arms are in vertical relation to said upper plate and said socket has been pivoted to have contactual relation with the end of said one arm where it is joined to said base, and means clamping said upper plate in adjusted position in a horizontal plane.

3. A fishing rod holder comprising a horizontally disposed mounting plate having a clamp on the under surface for engagement with a vertically disposed support, a horizontally disposed upper plate pivotally mounted, at one end, on the mounting plate in contact with and parallel to the mounting plate, a rod holding socket hinged to the upper plate, a U-shaped latch having a base and a pair of parallel arms and with the outer end of one of the arms hinged to the upper plate and positioned to retain the socket in contactual relation with the base of the U-shaped latch, selectively, in a vertical position when said one arm is in contact with said upper plate in horizontal relation thereto and also adapted to support the socket in an inclined position when the ends of the arms are in contact with said upper plate and said arms are in vertical relation to said upper plate and said socket has been pivoted to have contactual relation with the end of said one arm where it is joined to said base, and means clamping said upper plate in adjusted positions in a horizontal plane, said socket having a notch in one side of the open end for receiving a finger rest of a handle of a fishing rod.

4. A fishing rod holder comprising a horizontally disposed mounting plate having a clamp on the under surface for engagement with a vertically disposed support, a horizontally disposed upper plate pivotally mounted, at one end on the mounting plate in contact with and parallel to the mounting plate, a rod holding socket hinged to the upper plate, a U-shaped latch having a base and a pair of parallel arms and with the outer end of one of the arms hinged to the upper plate and positioned to retain the socket in contactual relation with the base of the U-shaped latch, selectively, in a vertical position when said one arm is in contact with said upper plate in horizontal relation thereto and also adapted to support the socket in an inclined position when the ends of the arms are in contact with said upper plate and said arms are in vertical relation to said upper plate and said socket has been pivoted to have contactual relation with the end of said one arm where it is joined to said base, and means clamping said upper plate in adjusted positions in a horizontal plane, said socket having a notch in one side of the open end for receiving a finger rest of a handle of a fishing rod, and also having a lug on one side positioned to coact with the latch to facilitate retaining the socket in a vertical position.

5. In a fishing rod holder, the combination which comprises a horizontally disposed mounting plate having spaced flanges extended downwardly from the under surface, a clamp screw threaded in one of said flanges, and positioned to coact with another of said flanges for securing the plate in position on a rail or side of a boat, a horizontally disposed upper plate pivotally mounted by a pin spaced from one end thereof on the mounting plate in contact with and parallel to the mounting plate, said upper plate having an arcuate slot therein positioned on a radius centered on said pin, a stud having a thumb nut threaded thereon extended from the mounting plate through the slot of the upper plate, a tubular socket hinged on the mounting plate and positioned at a point spaced from the pivotal mounting thereof, said socket having a lug on one side, and a U-shaped latch having a base and a pair of parallel arms with the extended ends of one of the arms pivotally mounted on the upper plate with the base of the U-shaped latch in contactual relation with the surface of said tubular socket and said U-shaped latch being positioned selectively so that the other of said arms will coact with the lug of the socket for retaining the socket in the vertically disposed position and when the one of said arms is in contactual relation with said lug will support the socket in an inclined position.

References Cited in the file of this patent
UNITED STATES PATENTS

| 2,199,034 | Witczak | Apr. 30, 1940 |
| 2,243,388 | Magyarosi | May 27, 1941 |
| 2,430,112 | Hamre | Nov. 4, 1947 |
| 2,529,148 | Frott | Nov. 7, 1950 |
| 2,580,130 | Rowdon | Dec. 25, 1951 |